Aug. 17, 1926.
N. E. NORSTROM
HAIR CLIPPER
Filed April 24, 1924
1,596,294
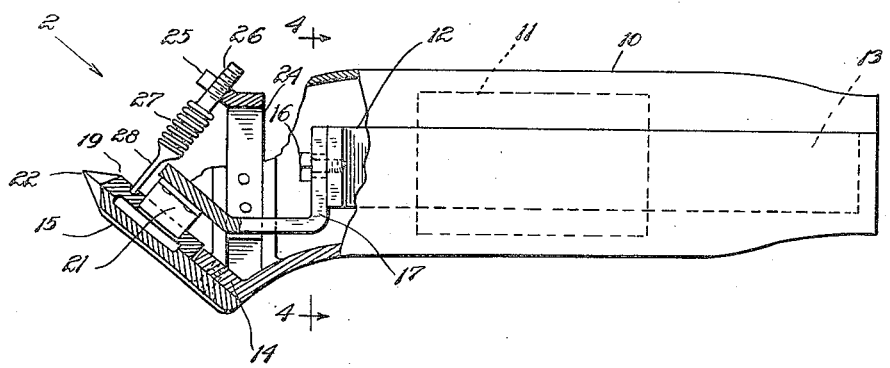
Inventor
Nils E. Norstrom
By Casper L. Redfield
Atty Patented Aug. 17, 1926.

1,596,294

UNITED STATES PATENT OFFICE.

NILS E. NORSTROM, OF CHICAGO, ILLINOIS.

HAIR CLIPPER.

Application filed April 24, 1924. Serial No. 708,609.

My invention relates to hair clippers and has for its object improvements in devices of that kind.

In the accompanying drawings—

Fig. 1 is an elevation, partly in section, of an electrically operated clipper;

Fig. 2 is a sectional elevation, being a view in the direction 2 of Fig. 1;

Fig. 3 is a plan of the movable clipper blade; and

Fig. 4 is a detail, being a section on line 4—4 of Fig. 1.

In the case 10 is a magnet 11 and armature lever 12 having one end connected to the case in any convenient manner at some point near the point 13. The forward part of the case 10 has an upwardly inclined lip 14 to which is secured a stationary clipper blade 15.

Secured to the forward end of the armature lever 12, by means of cap screws 16, is a bracket 17, the lower leg of which extends forward and then turns upward at an incline parallel with the blade 15, and a short distance above that blade. The holes 18 thru which the screws 16 pass are of larger diameter than those screws so that said bracket may be adjusted on the lever 12 and with respect to the blade 15.

The movable blade 19 is shorter at the rear end than blade 15, and in the body of the blade there is a slot 20. Secured to the under face of the inclined part of bracket 17 are two small brackets 21 which fit into the slot 20 in blade 19. The brackets 21 are of spring metal, and are pressed toward each other slightly when placed in the slot 20. They form the driving connection between the armature lever 12 and the movable blade 19. While the brackets 21 fit the edges of the slot 20 accurately, the depth to which they are pushed down into the slot may vary considerably without affecting the connection as a driving connection.

The vertical leg of the bracket 17 is adjustable in any direction on the face of the end of the armature lever by reason of the holes 18 being of larger diameter than the screws 16. If the bracket 17 is moved downward on the armature lever 12, then the blade 19 will be moved downward on blade 15, and the brackets 21 will be moved deeper into the slot 20. If the bracket 17 is adjusted upward on lever 12, then blade 19 will be adjusted upward on blade 15, and brackets 21 will enter less deeply into slot 20. In either of these operations, the brackets 21 and slot 20 form a slipping connection which permits a vertical adjustment on lever 12 to bring about an inclined adjustment of blade 19 so that the tips 22 of the two blades may have the proper forward and backward relationship to each other.

By reason of the fact that the holes 18 are larger than the screws 16, the bracket 17 may be given a slight pivotal motion in either direction on an imaginary point between the screws 16. Such pivotal motion at the vertical joint between lever 12 and bracket 17 results in a similar pivotal motion of the blade 19 on blade 15, and permits the tips 22 of blade 19 to match the line 23—23, which is represented in Fig. 3 as being a line along the corresponding tips of blade 15.

The blades 15 and 19 have their cutting edges in the form of teeth, as shown in Fig. 3. The length of movement of blade 19 on blade 15 is small and is definitely related to the space between adjacent teeth on a blade. To get the proper cutting effect with a short blade movement, the blade 19 must have a normal relationship to blade 15. The holes 18 around screws 16 permit adjustment to this normal position or relationship.

It will thus be seen that the adjustment of bracket 17 on screws 16 makes possible six different adjustments of the blade 19 on blade 15. These are:—upward at an incline, downward at an incline, rotation to the right, rotation to the left, adjustment laterally to the right, and adjustment laterally to the left. The slipping of the brackets 21 in and out in the slot 20 makes possible the first four of these. The other two depend solely on the adjustment of the bracket 17 on the screws 16.

Secured to the sides of the case 10 is a bridge 24, and in a lug 25 thereon is a screw 26 which projects a short distance into a helical spring 27. Secured in the lower end of spring 27 is a pin 28 which projects into a countersink 29 in blade 19. By screwing down on screw 26, blade 19 may be held against blade 15 with any desired pressure. A helical spring of this character is perfectly flexible in all lateral directions, and the blade 19 may be reciprocated without affecting the pressure applied by tightening screw 26.

What I claim is:

1. In a device of the class described, a case, a stationary blade, a movable blade mounted on the stationary blade, an adjusting screw supported by the case, a helical spring having its upper end mounted on the inner end of the screw, and a pin secured to the lower end of the spring and engaging a depression in the movable blade.

2. In a device of the class described, the combination with a case, a stationary blade, and a movable blade mounted on the stationary blade, of a helical spring serving as a compression spring to hold the movable blade against the stationary blade, and a screw serving to adjust the tension of said spring.

3. In a device of the class described, the combination with a case, a stationary blade, and an operating lever, of a movable blade mounted on the stationary blade, and a bracket interposed between the lever and the movable blade, said bracket having a slipping connection with the movable blade and being adjustable on said lever to adjust the movable blade with respect to the stationary blade.

4. In a device of the class described, a case, a stationary blade secured thereto, a movable blade mounted on the stationary blade and having an opening therein, a magnet and armature lever for driving the movable blade, and an intermediate device interposed between the lever and the movable blade and secured to each, said intermediate device being adjustable vertically on the lever to adjust the movable blade inward or outward with respect to the stationary blade, and said intermediate device having a slipping connection with said movable blade at the opening therein to accommodate such adjustment of the intermediate device with respect to the lever.

NILS E. NORSTROM.